(No Model.) 2 Sheets—Sheet 1.

J. R. DRODZEWSKI.
COUPLING FOR STEAM PIPES.

No. 363,374. Patented May 24, 1887.

Witnesses.
F. J. Bassett
N. J. Clark.

Inventor.
Julius R. Drodzewski.
Per. Sturgeon
Att'y.

(No Model.)  
2 Sheets—Sheet 2.

J. R. DRODZEWSKI.
COUPLING FOR STEAM PIPES.

No. 363,374. Patented May 24, 1887.

Witnesses.  
F. J. Bassett  
N. J. Clark

Inventor.  
Julius R. Drodzewski  
Per A. Sturgeon  
Att'y.

UNITED STATES PATENT OFFICE.

JULIUS R. DRODZEWSKI, OF ERIE, PENNSYLVANIA, ASSIGNOR OF TWO-THIRDS TO JOSEPH McCARTER AND JOHN M. ORMSBEE, BOTH OF SAME PLACE.

COUPLING FOR STEAM-PIPES.

SPECIFICATION forming part of Letters Patent No. 363,374, dated May 24, 1887.

Application filed February 7, 1887. Serial No. 226,848. (No model.)

*To all whom it may concern:*

Be it known that I, JULIUS R. DRODZEWSKI, a citizen of the United States, residing at Erie, in the county of Erie and State of Pennsylvania, have invented certain new and useful Improvements in Couplings for Steam-Pipes between Railway-Cars; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in couplings for steam-pipes between railway-cars, hereinafter set forth and explained in the specification and claims and illustrated in the accompanying drawings, in which—

Figure 1:
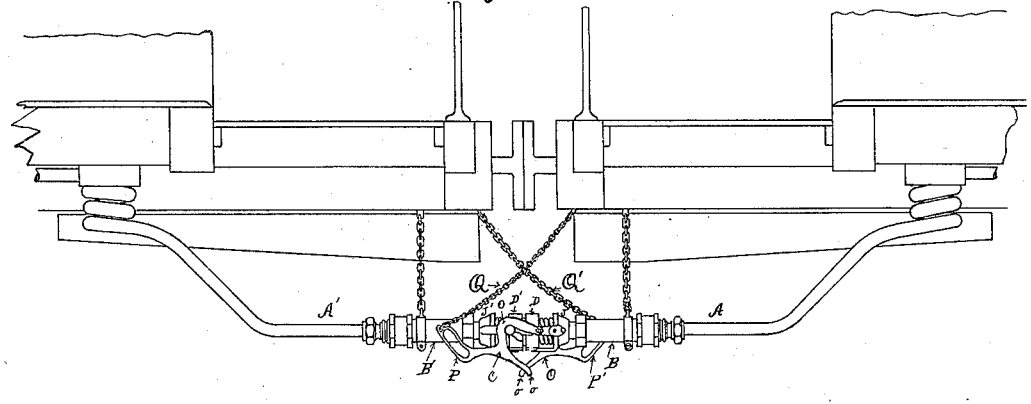
Figure 3:
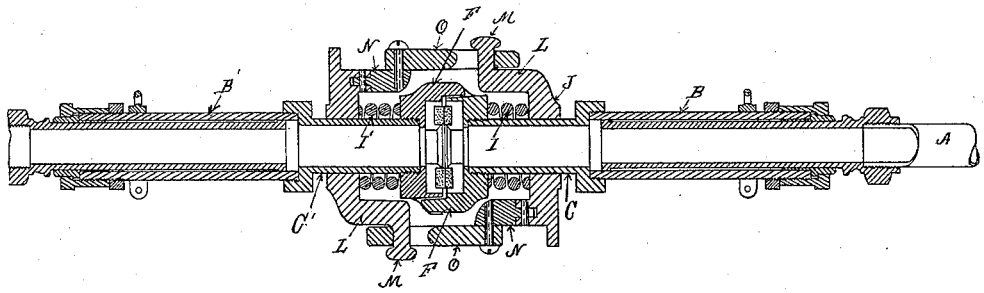
Figure 2:
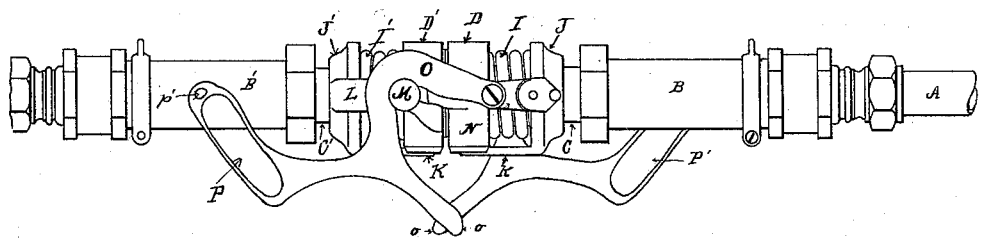
Figure 4:
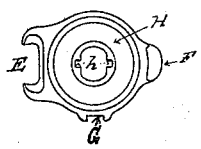
Figure 5:
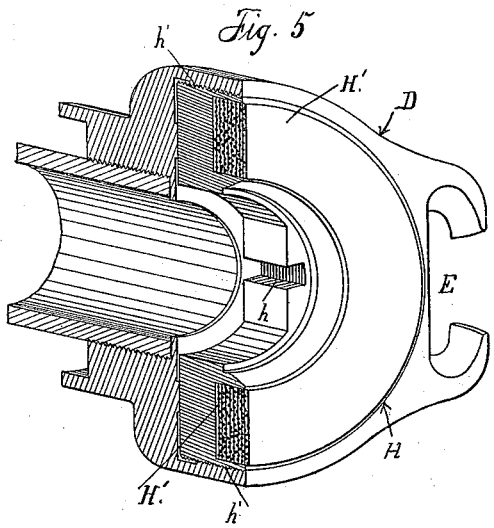
Figure 6:
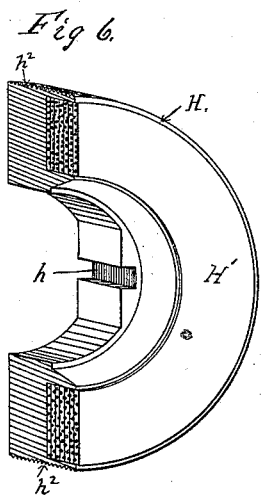
Figure 7:
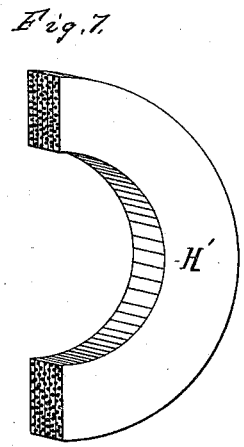

Figure 1 is a side elevation of my improved coupling for steam-pipes between railway-cars. Fig. 2 is a side elevation of my improved coupling. Fig. 3 is a central longitudinal section of same. Fig. 4 is an end view of one section of the coupling with the lever removed therefrom. Fig. 5 shows an enlarged view of a longitudinal central section of one of the packing-heads of my device, illustrating the screw-threaded removable packing-shell therein. Fig. 6 shows a like enlarged section of the screw-threaded packing-shell detached from the packing-head. Fig. 7 shows a like sectional view of the packing removed from the shell.

Like letters refer to like parts in all the figures.

In the construction of my improvement shown in the drawings, A A' are two steam-pipes, provided with telescopic joints B B', to provide for the slack in the car-couplings. To the outer ends of each of the telescopic joints B B', I screw short pipe-sections C C', upon the outer ends of which I screw heads D D', provided on one side with a slot, E, and on the other with a projecting arm, F, and also on their under sides with slots G, as and for the purpose hereinafter specified.

In the ends of each of the heads D D', I cut suitable screw-threads, $h'$, adapted to fit and receive screw-threaded packing-shells H, the peripheries of these shells being provided with screw-threads $h^2$, adapted to fit the screw-threads $h'$ in the heads D and D', the shells H being also chambered out radially on one side to receive the annular rings H of steam-packing, so that when the packing-rings H are in place and the heads D D' are brought together they will form a steam-tight joint. The central part of these packing-shells H are provided with small notches $h$, adapted to receive a wrench, so that they can be quickly removed and replaced by new shells H provided with packing in case the packing becomes worn so as to leak steam. The shells H are of such length that when in place in the heads D D' they will project slightly beyond the ends thereof, so that when the heads D D' are brought together and coupled the packing in the shells will be tightly pressed together without any contact of the ends of the heads D D'. On the pipes C C', back of the heads D D', I place spiral springs I I', and back of these springs I place sliding collars J J', each of these collars being provided on its under side with an arm, K, which extends over the springs I I' into the grooves G in the under sides of the heads D D' and operates as guides for the collars J J'. On one side of each of the collars J J', I provide a short arm, L, which has a stud-pin, M, thereon, and on the opposite side of each of the collars J J', I hinge a short link, N, which has hinged thereto a cam-hook, O, adapted to be hooked over the stud-pins M, the hooks O O being of such shape that when the heads D D' are brought together the points $o\ o$ of the hooks O O will easily pass on the stud-pins M, and as they are pressed down upon the stud-pins M M will draw the heads D D' tightly together, compressing the springs I I' in the operation, which springs are adapted to take up all slack and prevent any looseness in the joint. The cam-hooks O are also provided with handles P P', for convenience in handling the hooks O. These handles project some distance beyond the hooks, and are provided with openings $p\ p'$, to which are attached small chains Q Q', the ends of which chains are secured to the car, so that in case the couplings of the cars pull apart the chains Q Q' will operate to unhook the hooks O O without injury to the coupling-joint of the steam-pipe.

I have thus described and shown convenient devices and mechanism for utilizing my invention. I am, however, aware that many of the features shown and described may be varied in their construction without departing from the spirit of my invention and good results obtained therefrom. Therefore I do not desire to limit myself to the exact construction shown.

What I claim as new, and desire to secure by Letters Patent of the United States, is—

1. In a coupling for steam-pipes between railway-cars, the combination of a packing-head on the end of each of the pipe-sections to be coupled, having a longitudinal slot on one side and a projecting arm on the other side adapted to enter the slot in the opposite head, with a sliding sleeve on each pipe back of the packing-head, having a hook pivoted on one side and a stud-pin on the other side, so that the hook on one sleeve will engage with the stud-pin on the opposite sleeve, and spiral springs encircling the pipes between the said sleeves and the packing-heads, substantially as and for the purpose set forth.

2. In a coupling for steam-pipes between railway-cars, the combination of suitable packing-heads on each of the pipe-sections to be coupled, with sleeves back of said heads, adapted to slide on each pipe-section, said sleeves having hinged to one side thereof a link, and a cam-hook hinged to said link adapted to engage with a stud-pin on the other sleeve, and spiral springs between said heads and sleeves, and flexible connections from each of said cam-hooks to the car, substantially as and for the purpose set forth.

3. In a coupling for steam-pipes between railway-cars, the combination, with the heads D D', of the springs I I', the sliding sleeves J J', each provided with the cam-hook O, and stud-pin M, substantially as and for the purpose set forth.

4. In a coupling for steam-pipes between railway-cars, the combination of the heads D D' provided with the removable packing-shells H and the slots E and G, and the arm F, with the springs I I', the sliding sleeves J J', provided with the guide-arms K K, the stud-pins M M, and the cam-hooks O O, adapted to engage with said stud-pins, substantially as and for the purpose set forth.

5. In a coupling for steam-pipes between railway-cars, the combination of the packing-heads D and D' and their removable packing-shells H with the sliding-sleeves J J', having hooks O and stud-pins M thereon, the spiral springs I I', and the telescopic joints B B', substantially as and for the purpose set forth.

6. In a coupling for steam-pipes between railway-cars, the combination of the telescopic joints B B' and the coupling-heads D D', secured thereto, with the springs I I' and the sliding sleeves J J', provided with the stud-pins M M and the links N N, and cam-hooks O O, hinged thereto, substantially as and for the purpose set forth.

In testimony whereof I affix my signature in presence of two witnesses.

JULIUS R. DRODZEWSKI.

Witnesses:
    H. C. CANTOR,
    H. J. CURTZE.